3,551,170
ALCOHOL-SOLUBLE COLOR SALTS
Werner Kuster, Basel, Switzerland, assignor to
J. L. Geigy AG, Basel, Switzerland
No Drawing. Filed Feb. 14, 1966, Ser. No. 527,081
Claims priority, application Switzerland, Dec. 10, 1965,
17,098/65
Int. Cl. C09d 11/00, 11/06, 11/08
U.S. Cl. 106—22
1 Claim

ABSTRACT OF THE DISCLOSURE

A storable composition especially suitable for printing inks is provided herein comprising a color salt of the formula

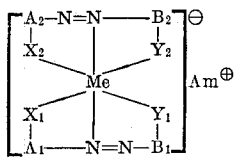

in which formula:

$A_1$ and $A_2$ each represent together with the —N=N— bridge to which they are linked a radical of a diazonium benzene moiety of an azo dyestuff, each component bearing $X_1$ and $X_2$, respectively, in ortho-position to its respective —N=N— bridge, $B_1$ and $B_2$ each represent the radical of a benzene, naphthalene, pyrazole or acetoacetylarylamide coupling component, bearing $Y_1$ and $Y_2$, respectively, in ortho-position to the —N=N— bridge, $X_1$ and $X_2$ each represent —O—, —COO— or —N—SO$_2$—R$_1$, wherein R$_1$ is an alkyl or aryl radical, $Y_1$ and $Y_2$ each represent preferably —O—, or they represent —N—R$_2$, wherein R$_2$ is hydrogen or an alkyl or aryl radical, Me represents chromium or cobalt, and Am$^\oplus$ represents a cation moiety selected from the class consisting of dehydroabietylammonium, dihydroabietyl-ammonium, tetrahydroabietylammonium and dextropimarylammonium, in a concentration of at least 10% calculated on the total weight of the composition, and a polar, oxygen-containing organic solvent therefor.

---

This invention relates to new alcohol-soluble color salts, processes for the production thereof, as well as, as industrial products, the alcoholic solutions, especially of film-forming lacquers, vehicles and inks containing the new alcohol-soluble color salts.

The new alcohol-soluble color salts according to the invention comprise a dyestuff anion moiety which is the anion of a chromium or cobalt complex of an at least tridentate complexingazo dyestuff which is free from groups which dissociate acid in water and do not participate in complex formation, and an ammonium-alkyl-polyalkyl-polyhydrophenanthrene cation moiety.

Preferably, the above-mentioned anionic moiety contains per chromium or cobalt atom either two tridentate-complexing azo dyestuff molecules as ligands or one molecule of a higher dentate-complexing azo dyestuff, for instance, a tetradentate-complexing azo dyestuff, preferably in combination with one bidentate ligand free from chromophoric groups.

Most preferred are, in the first instance, compounds of the formula

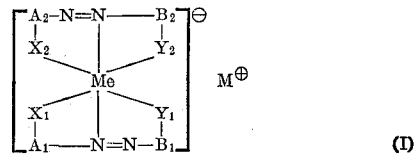

in which formula:

$A_1$ and $A_2$ each represent, together with the —N=N— bridge to which they are linked, a radical of a diazonium benzene moiety of an azo dyestuff, each component bearing $X_1$ and $X_2$, respectively, in ortho-position to its —N=N— bridge, $B_1$ and $B_2$ each represent the radical of a benzene, naphthalene, pyrazole or acetoacetylarylamide coupling component, bearing $Y_1$ and $Y_2$, respectively, in ortho-position to the —N=N— bridge, $X_1$ and $X_2$ each represent —O—, —COO— or —N—SO$_2$—R$_1$, wherein R$_1$ is an alkyl or aryl radical, $Y_1$ and $Y_2$ each represent preferably —O—, or they represent —N—R$_2$, wherein R$_2$ is hydrogen or an alkyl or aryl radical, Me represents chromium or cobalt, and M$^\oplus$ represents an ammonium-alkyl-polyalkyl-polyhydrophenanthrene cation.

When $B_1$ or $B_2$ represent the radical of a naphthalene coupling component, the latter is linked with its 1-position to the respective —N=N— bridge and with its 2-position to $Y_1$ or $Y_2$, respectively, or vice versa. When $B_1$ or $B_2$ is the radical of a pyrazole coupling component, it is preferably a 1-aryl-3-alkyl pyrazole radical which is linked in 4-position to the respective —N=N— bridge and in 5-position to $Y_1$ or $Y_2$, respectively.

Alkyl groups in the above-mentioned radicals possess preferably from 1 to 5 carbon atoms; aryl radicals are preferably benzene groupings.

Aromatic rings in these radicals, especially benzene nuclei can be substituted in a manner compatible with the respective radicals being or being part of diazo components or coupling components of azo dyestuffs as defined. Compatible substituents are the following: lower alkyl groups such as the methyl or ethyl group, a propyl, butyl or amyl group, cycloalkyl groups such as the cyclohexyl group, lower alkoxy groups such as the methoxy or ethoxy group, phenoxy groups, halogens such as fluorine, chlorine or bromine, acyl groups, e.g. lower alkyl-sulfonyl groups such as the methylsulfonyl or ethylsulfonyl group; arylsulfonyl groups such as the phenylsulfonyl or p-methyl-phenylsulfonyl group; alkanoyl groups such as the acetyl or propionyl group; aroyl groups such as the benzoyl or 3-chloro-benzoyl group, or carboxylic acid ester groups, particularly lower carbalkoxy groups such as carbomethoxy and carboethoxy groups, also sulfonic or carboxylic acid amide groups (including those substituted at the N atom, the preferred N-substituents being lower alkyl groups or the phenyl group), or the nitro, cyano or trifluoromethyl group.

A great number of complex chromium and cobalt compounds of Formula I are known. They are obtained, for example, by reacting agents giving off chromium or cobalt with the corresponding metallizable azo dyestuffs in an alkaline or neutral medium. Examples of such metallizable azo dyestuffs are coupling products from the diazo and coupling components given below:

Diazo components.—2-amino-4-alkylphenols, 2-amino-4,5-dialkylphenols, 2-amino - 1,4 - dialkoxybenzenes, 2-amino-4- or -5-halogen-phenols, 2-amino-4,6-dihalogen-phenols, 2-amino-4- or -5- alkylsulfonyl phenols, 2-amino-4- or -5- phenylsulfonyl phenols, 2-amino-4-alkanoyl phenols preferably having a lower alkanoyl radical, 2-amino-4-benzoyl phenol, 2-aminophenol-4-carboxylic acid alkyl esters, 2-aminophenol-4-carboxylic acid alkyl amides, 2-aminophenol-4- or -5-sulfonic acid amide, 2-aminophenol-4- or -5-sulfonic acid alkyl amides, 2-amino-4- or -5-nitrophenol, 2-amino-4-alkyl-6-nitrophenols, 2-amino-4-alkylsulfonyl-5-nitrophenols, 2-amino-4-cyanophenol, 2-amino-4-trifluoromethyl-phenol, 2 - amino-1-(bis - alkylsulfonylamino)-benzene, 2-amino-1-(bis-phenylsulfonyl - amino)-benzene, 2 - amino-1-(bis-p-alkylphenylsulfonyl - amino)-benzene (the sulfonyl group is split off after the coupling is complete), 2-aminobenzoic acid or 2-aminobenzoic acid-4- or -5- sulfonic acid amide or 2-aminobenzoic acid-4- or -5- sulfonic acid alkylamide.

Coupling components.—4-alkylphenols, 2,4- or 3,4-dialkylphenols, 4-cycloalkylphenols, 1-hydroxynaphthalene-4-sulfonic acid amide or alkylamides, 1-hydroxynaphthalene-3,6-bis-sulfonic acid amide or alkylamides, 2-hydroxynaphthalene, 2-hydroxy-8-alkanoyl - aminonaphthalenes, e.g. 2-hydroxy-8-acetylaminonaphthalene, 2-aminonaphthalene, 1-phenyl-3-alkyl-5-hydroxy- or -5-amino-pyrazoles, 1-(halogen-phenyl, alkyl-phenyl or -alkylsulfonylphenyl)-3-alkyl- or -3-alkoxy- 5-hydroxy- or -5-amino-pyrazoles, 1-(sulfamoyl-phenyl)- or 1-(N-alkylsulfamoylphenyl)-3-alkyl-5-hydroxy- or -5-amino- pyrazoles, acetoacetyl-phenyl amide, acetoacetyl-halogenophenyl amides, -alkylphenyl amides or -alkylsulfonylphenyl amides or acetoacetyl-(sulfamoyl-phenyl) - amide or -(N-alkylsulfamoyl-phenyl)-amides. (In the above, "alkyl" and "alkoxy" have preferably 1 to 6 carbon atoms; "halogen" means in particular chlorine or bromine).

Anionic complex chromium or cobalt compounds usable according to the invention which contain no groups which dissociate acid in water and do not take part in the complex formation and also contain one molecule of a more than tridentate complex-forming azo dyestuff to each chromium or cobalt atom, preferably correspond to Formula II

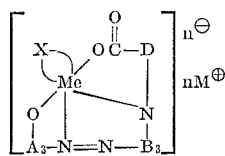

(II)

in which formula:

$A_3$ represents a radical of the benzene series containing —O— in a position adjacent to the azo bond, D represents a radical of the benzene series containing the group

in a position adjacent to the nitrogen bond, $R_3$ represents a radical of the naphthalene series containing —N in a position adjacent to the azo bond, Z represents a bidentate ligand giving an anionic character to the complex Me represents chromium or cobalt, $M^\oplus$ represents an alkali metal ion, particularly the sodium ion or ammonium ion, and n represents a whole number, particularly 1 or 2.

The bidentate ligand Z and Me together form a 5- or 6-membered ring and give to the complex, preferably one or two negative charges; in the first case the bidentate ligand is, e.g. the radical of 8-hydroxyquinoline, in the second case it is, e.g. the salicylic acid radical.

Preferred complexes of this type are those which correspond to Formula III.

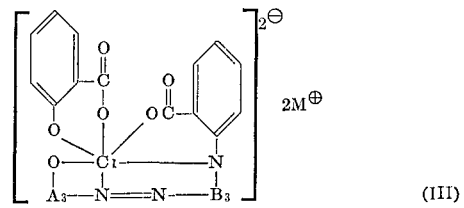

(III)

wherein $A_3$, $B_3$ and $M^\oplus$ have the meanings given in Formula II. These complexes are obtained, for example, by reacting water-soluble salicylato chromiates with azo dyestuffs of the formula

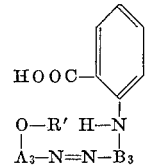

wherein R' is principally hydrogen but can also be an aliphatic radical, particularly a lower alkyl radical and $A_3$ and $B_3$ have the meanings given in Formula II.

(The coupling products of the diazotized 2-aminophenols mentioned above or their ethers such as alkyl ethers with 2-(2'-carboxyphenylamino)-naphthalene are mentioned as examples of azo dyestuffs.)

Preferred aminoalkyl-polyalkyl-polyhydrophenanthrene moieties are those derived from dehydroabietylamine, dihydroabietylamine, tetrahydroabietylamine and dextropimarylamine, or the formulas

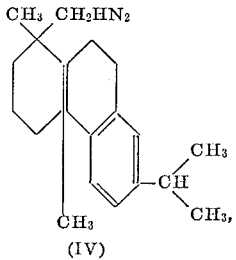 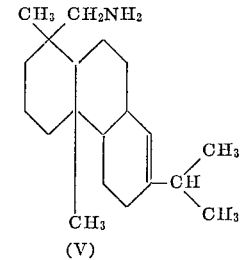

(IV)                (V)

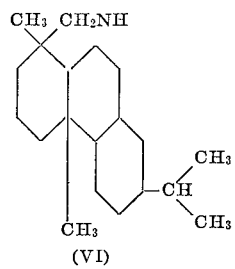 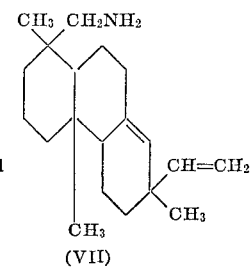

(VI)               (VII)

respectively, or, more preferably, mixtures of these polyhydrophenanthrenes, more particularly such mixtures which contain from 5% to 95% of dehydroabietylamine, the balance consisting of one, two or three of the other abietylamines, the formulas of which are given above. Such mixtures, some of which are commercially available under such trade names as Rosinamine, may also contain up to about 10 to 15% of dextropinarylamine or colophony as impurity.

The color salts according to the invention are only very slightly soluble (less than 1 part thereof in 1,000 parts of water), but are of excellent solubility in oxygen-containing, polar organic solvents, especially in alcohols, alcohol ethers or ketonic or ester solvents, for instance, in lower alkanols such as methanol, ethanol, n-propanol, isopropanol or butanol, in alkylene glycol monoakyl ethers, e.g. ethylene glycol monomethyl or-ethyl ether, in alkylene glycols such as propylene glycol, or in araliphatic alcohols such as benzyl alcohol, or in mixtures of such alcohols; they are also soluble in ketones such as acetone, methylethyl ketone, methyl isobutyl ketone or cyclohexanone, in ester solvents such as methyl acetate, ethyl acetate, butyl acetate, glycol monoacetate or ethyl lactate, and in halogenated, preferably aliphatic hydrocarbons such as chloroform, methylene chloride, ethylene chloride or carbon tetrachloride.

Owing to their good solubility in acetone and the like ketonic solvents, the color salts according to the invention are useful in the dyeing of cellulose 2½ acetate spinning masses, and in view of their good solubility in halogenated aliphatic hydrocarbons they can be used for the spin-dyeing of cellulose triacetate.

Because of their good solubility in oxygen-containing organic, and especially in polar solvents of this type, such as, more particularly, in alcohols and alcohol ethers, the color salts according to the invention are useful in the coloring of solutions, in these solvents, of film-forming primary materials, especially vehicles for lacquers and inks. Such lacquer and ink vehicles are useful principally in the preparation of lacquers and printing inks, respectively, and in the latter case especially of inks for use in flexographic printing, silk screen printing and rotogravure.

As vehicles these solutions contain, e.g. rosins such as shellac or Manila copal; or cellulose derivatives, for example cellulose ethers such as ethyl cellulose, or cellulose esters such as nitrocellulose, also maleinic resins or phenol-formaldehyde resins, those modified with colophony, for instance condensates of colophony or abietinic acid, maleic anhydride and a polyhydric alcohol such as glycerol, pentaethritol or dimethyl propane, described, e.g. in U.S. Pat. 2,347,923 and commercially available under such trade names as Cellolyne, Beckacite or Alresate; polyamide resins, e.g. polycondensation products of polyamines with polycarboxy compounds, especially with dimeric or trimeric fatty acids, which products are described in U.S. Pat. 2,663,649; formaldehyde urea and formaldehyde melamine condensates, ketone-formaldehyde condensates, polyvinyl acetate or acrylic resins such as poly-(butylacrylate), or mixtures thereof.

In addition, the above-described alcoholic solutions of color salts according to the invention can also contain the auxiliaries usual in the lacquer and printing industries such as wetting agents, e.g. higher fatty acid hydroxyalkylamides such as coconut oil fatty acid di-β-hydroxyethylamide, and anti-blocking agents, such as polyethylene wax.

Printing inks prepared with these alcoholic vehicle-containing solutions of color salts according to the invention are suitable, for example, for the printing of various types of materials such as metal, e.g. aluminum sheets, paper, glass, plastic, synthetic resin and regenerated cellulose products, e.g. viscose films, etc. They are stable on storing, ("can stability"), free from gelling, non-corroding and non-explosive and produce waterproof and fast-adhereing coatings on the materials mentioned.

Printing processes employed can be flexoprinting, rotogravure or the like methods.

The color salts according to the invention are also very useful as coloring component in ball pen inks and can also be used for the coloring of cellulose esters, synthetic polyamides or polyurethanes in the mass (dope dyeings).

Prints produced by any of the aforesaid processes, but especially of flexographic printing with printing inks according to the invention on the surface of viscose foil, be it in the form of uniform color coatings or patterns, are free from bleeding, since the coating is resistant to softners, e.g. glycerol or sorbite, present in viscose foils.

Similar anvantageous properties are also shown in flexographic and rotogravure printings produced with the above-described printing inks on paper, e.g. on wrappings for sweets and candies and the like, which printings are after treated in a glycerol-water bath.

An especially advantageous and very surprising property of the color salts according to the invention resides in the fact that they form solutions in the above-described polar organic solvents, especially in alcohols, in high concentrations, above 10%, and up to 50% by weight calculated on the total weight of the solution, and in even higher concentrations in the form of highly viscous, clear and homogeneous, "syrupy liquids" which are storable at room temperature over long periods in practically unchanged condition, i.e. free from sedimentation or deterioration. This "can" stability is of great importance; hitherto known color salts only afford alcoholic, especially ethanolic solutions of maximally 5–10% and usually only up to about 2 to 3% of satisfactory "can" stability at room temperature for periods of a month and longer. At higher concentrations alcoholic solutions of such known color salts stored for longer periods at room temperature (16–35° C.) will gel or deteriorate e.g. due to corrosive effects on the cans containing them.

The invention is further illustrated by the following non-limitative examples in which temperatures are given in degrees Centigrade and all parts and percentages are by weight unless expressly stated otherwise.

EXAMPLE 1

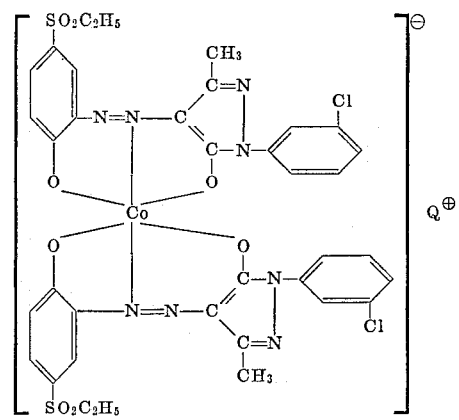

168.2 g. of the azo dyestuff 2-amino-4-ethylsulfonylphenol→1 - (3' - chlorophenyl) - 3 - methyl - 5 - hydroxypyrazole are slurried within 30 minutes in 350 ml. of 120° hot mormamide. 60 g. of cobalt acetate (23.6% cobalt content) are added to this slurry within half an hour whereupon the azo dyestuff dissolves to form the cobalt complex. The reaction mixture is kept at 120° until cobalting is complete, then cooled to 90° after which it is added dropwise within 1 hour to 4000 ml. of an about 20° warm solution of 12 g. 85% formic acid and 63 g. of a commercially available aminoalkyl-polyhydrophenanthrene mixture consisting of 50% of dehydrobietylamine, 20% of dihydroabiethylamine, 20% of tetrahydroabietylamine and, as impurity, 10% of colophony, the equivalent weight of the mixed cation of this mixture being represented by Q⊕ in the above formula, in water. The water insoluble color salt of the cobalt complex with the aminoalkyl-polyhydrophenanthrene mixture precipitates. It corresponds to the above formula. The reaction mixture is then stirred for 14 hours at room temperature, then heated within 1 hour to 50°, kept for 2 hours at this temperature, filtered hot and the residue is washed with weakly formic acid water and dried.

The color salt of the above formula is a yellow-brown powder which dissolves in concentrated sulfuric acid with a greenish yellow color. It dissolves very well, with a brownish yellow color, in methanol, ethanol or propanol.

If, instead of 63 g. the aforesaid aminoalkyl-polyhydrophenanthrene mixture, 63 g. of dehydroabietylamine or 63 g. of dihydroabietylamine or 63 g. of tetrahydroabietylamine are used and the procedure described in this example is followed, then the corresponding dehydro-, dihydro- or tetrahydroabietylamine salt of the 2:1 cobalt complex of the above azo dystuff is obtained which has similar properties to the salt obtained with the aminoalkyl-polyhydrophenanthrene mixture according to the above example.

If, instead of the 168.2 g. of the azo dyestuff given above, equimolar amounts of one of the azo dyestuffs given in the following Table 1 are used and otherwise the procedure given in Example 1 is followed, then the color salts of the corresponding 2:1 cobalt complexes are obtained, the colors of the solutions of which in ethanol are given in Column III of the same table.

45.5 g. of 2-amino-4-ethylsulfonyl phenol are slurried in 400 ml. of water which contains 20 ml. of concentrated hydrochloric acid, the slurry is diazotized by the addition of a solution of 13.8 g. of sodium nitrite in 50 ml. of water at 0-3° and is then neutralized for 2 to 3 hours with sodium bicarbonate.

A solution of 44 g. of 1-(4'-chlorophenyl)-3-methyl-5-hydroxypyrazole and 8.5 g. of sodium hydroxide in 400 ml. of water is poured into this diazo suspension within 30-60 minutes. The yellow azo dyestuff is formed. 20 g. of the condensation product of formaldehyde and naphthalene sulfonic acid are added to this reaction mixture, the mixture is heated to 80° within half an hour, a solution of 30 g. of cobalt acetate (23.6% cobalt content) in 200 ml. of water is added, the whole is brought to the boil and it is kept under reflux for 10 hours. At the end of this time, the temperature is reduced to 80°, a solution of 32 g. of the aminoalkyl-polyhydrophenanthrene mixture used in Example 1 and 20 ml. of 85%

TABLE I

| I, No. | II, azo dyestuff | III, shade of ethanol solution |
|---|---|---|
| 2 | 2-amino-4-methylsulphonyl-phenol→4-methylphenol | Brown. |
| 3 | 2-amino-4-methylsulphonyl-phenol→4-cyclohexylphenol | Do. |
| 4 | 2-amino-4-methylsulphonyl-phenol→1-hydroxynaphthalene-4-sulphonic acid amide | Red violet. |
| 5 | 2-amino-4-methylsuphonyl-phenol→1-hydroxynaphthalene-4-sulphonic acid methylamide | Do. |
| 6 | 2-amino-4-methylsulphonyl-phenol→2-hydroxynaphthalene-6-sulphonic acid amide | Do. |
| 7 | 2-amino-4-methylsulphonyl-phenol→2-hydroxynaphthalene-7-sulphonic acid amide | Do. |
| 8 | 2-amino-4-tert. amyl-6-nitrophenol→2-hydroxynaphthalene | Do. |
| 9 | 2-aminophenol-4-sulphonic acid methylamide→2-hydroxynaphthalene | Do. |
| 10 | 1-[2'-(p-methylphenylsulphonylamino)-phenyl-azo]-2-hydroxynaphthalene | Claret. |
| 11 | 2-amino-5-methylsulphonylphenol→1-phenyl-3-methyl-5-hydroxypyrazole | Brownish yellow. |
| 12 | 1-phenyl-3-methyl-4-[2'-(p-methylphenylsulphonylamino)-phenylazo]-5-hydroxypyrazole | Do. |
| 13 | 2-aminophenol-4-sulphonic acid amide→1-(4'-methylphenyl)-3-methyl-5-hydroxypyrazole | Do. |
| 14 | 2-amino-4-methylphenol→1-(4'-methylsulphonylphenyl)-3-methyl-5-hydroxypyrazole | Do. |
| 15 | 2-amino-4,5-dimethylphenol→1-(4'-methylsulphonylphenyl)-3-methyl-5-hydroxypyrazole | Do. |
| 16 | 2-amino-4-chlorophenol→1-phenyl-3-methyl-5-hydroxypyrazole-3'-sulphonic acid amide | Do. |
| 17 | 2-amino-4-nitrophenol→1-phenyl-3-methyl-5-hydroxypyrazole-3'-sulphonic acid amide | Do. |
| 18 | 2-amino-4-cyanophenol→1-phenyl-3-methyl-5-hydroxypyrazole-3'-sulphonic acid amide | Do. |
| 19 | 2-amino-4-ethylsulphonylphenol→1-phenyl-3-methyl-5-aminopyrazole | Yellow-brown. |
| 20 | 2-amino-4-methylsulphonylphenol→acetoacetyl-phenylamide | Yellow. |
| 21 | 2-amino-4-methylsulphonylphenol→acetocetyl-(2-chlorophenyl)-amide | Do. |

EXAMPLE 22

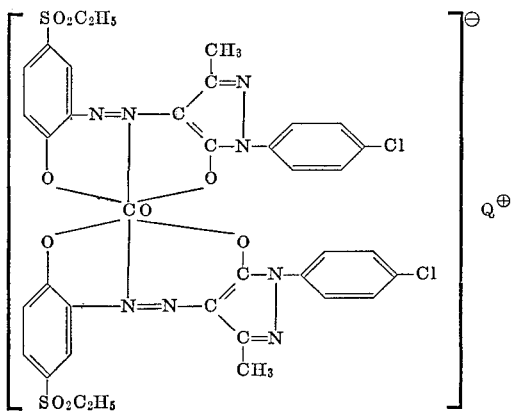

formic acid in 1000 ml. of water is added to the reaction mixture and the whole is kept for 6 hours at this temperature. The aminoalkylpolyhydrophenanthrene salt of the 2:1 cobalt complex of the azo dyestuff mentioned above is so formed. This is worked up as described in Example 1.

$Q^\oplus$ in the formula given in this example and in subsequent formulas has the same meaning as in the formula of Example 1, namely, it represents the mixed ammonium cation derived from the aminoalkyl-polyhydrophenanthrene mixture used therein.

EXAMPLE 23

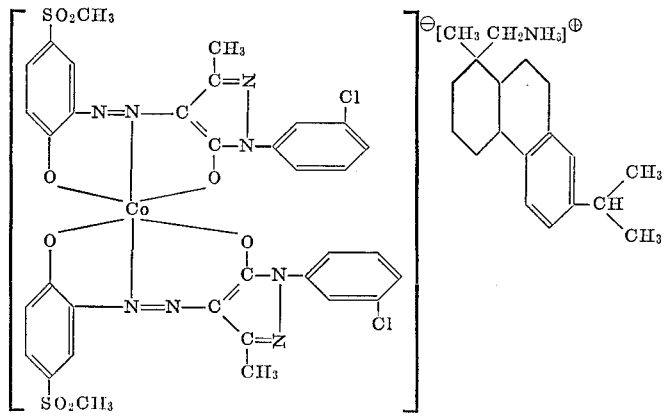

157.0 g. of the azo dyestuff 2-amino-4-methylsulfonylphenol→1 - (3' - chlorophenyl)-3-methyl-5-hydroxypyrazole are slurried within 30 minutes in 350 ml. of 120° hot formamide. 60 g. of cobalt acetate (23.6 cobalt content) are added to this slurry within half an hour whereupon the azo dyestuff mentioned dissolves in the form of the cobalt complex. The reaction mixture is kept at 120° until the cobalting is complete. It is then cooled to 90° and added dropwise within 1 hour to 4000 ml. of an about 20° warm solution of 12 g. of 85% formic acid and 63 g. of dehydroabietylamine in water. The water insoluble color salt of the cobalt complex with dehydroabiethylamine precipitates. It corresponds to the above formula. The reaction mixture is then stirred for 14 hours at room temperature, heated to 50° within 1 hour, kept for two hours at this temperature, filtered hot and the residue is washed with weakly formic acid water and dried.

The color salt of the above formula is a yellow-brown powder which dissolves in concentrated sulfuric acid with a greenish yellow color. It dissolves very well, with a brownish yellow color, in methanol, ethanol or propanol.

If, instead of the 63 g. of dehydroabietylamine, 63 g. of dihydroabietylamine or 63 g. of tetrahydroabietyl- 8.0 g. of the complex chromium compound which contains two molecules of the azo dyestuff 2-amino-4-methylsulfonylphenol→1-phenyl - 3 - methyl - 5 - hydroxypyrazole to one chromium atom are slurried in 1500 ml. of 50° warm water, a solution of 6.2 g. of aminoalkyl-polyhydrophenanthrene mixture used in Example 1 and 2 ml. of 85% formic acid in 50 ml. of water is added, the whole is stirred for 1 hour at 60°, filtered at the same temperature and the residue is washed with 1000 ml. of weakly formic acid water and dried.

The aminoalkyl-polyhydrophenanthrene salt of the above formula is so obtained. It is a dark red powder which dissolves in concentrated sulfuric acid with a greenish yellow color and it dissolves very well in ethanol with a red-orange color.

If, instead of the 8.0 g. of the above chromium compound, equimolar amounts of a chromium compound containing per chromium atom two molecules of one of the azo dyestuffs given in the following Table 2 is used and otherwise the procedure given in the example is followed, then corresponding color salts with the aminoalkyl-polyhydrophenanthrene mixture of Example 1 are obtained, the color of solutions of which in ethanol are given in Column III of this table.

TABLE 2

| I, No. | II, azo dyestuff | III, color of ethanol solution |
|---|---|---|
| 25 | 2-aminophenol-4-sulfonic acid amide→1-phenyl-3-methyl-5-hydroxypyrazole | Orange. |
| 26 | 2-amino-4-ethylsulfonylphenol→1-(2'-chlorophenyl)-3-methyl-5-hydroxypyrazole | Do. |
| 27 | 2-aminophenol-4-sulfonic amide→1-(4'-methylphenyl)-3-methyl-5-hydroxypyrazole | Do. |

EXAMPLE 28

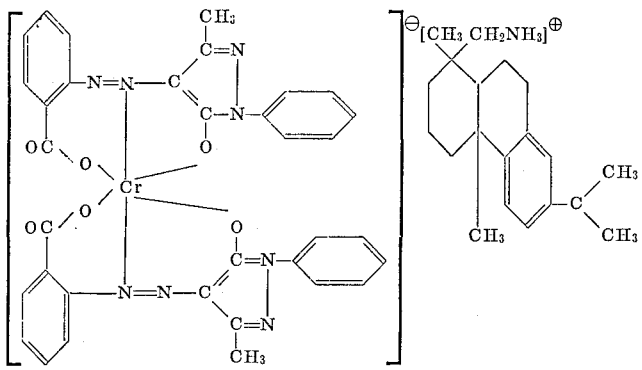

amine or 63 g. of the aminoalkyl-polyhydrophenanthrene mixture used in Example 1, are used and otherwise the procedure described in this example is followed, then the corresponding dihydro- or tetrahydro- abiethlamine salt or the aminoalkyl-polyhydrophenanthrene salt, respectively, of the 2:1 cobalt complex of the azo dyestuff given above is obtained which has properties similar to those of the dehydrobietylamine salt described in this example.

EXAMPLE 24

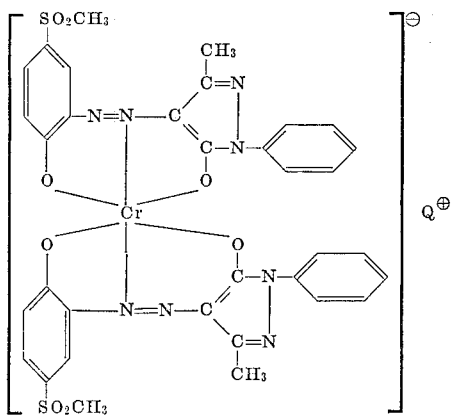

33.0 g. of the azo dyestuff 2-aminobenzoic acid→1-phenyl-3-methyl-5-hydroxypyrazole are slurried within 30 minutes in 150 ml. of 120–130° hot formamide. 12.75 g. of chromic acetate (21.2% chromium content) are added to this slurry within half an hour whereupon the coupling product mentioned dissolves as chromium complex. The reaction mixture is kept at 120–130° until the chroming is complete, then cooled to 90° and added dropwise within 1 hour to 1000 ml. of an about 20° warm solution of 3 ml. of 85% formic acid and 17.1 g. of dehydroabietylamine in water. The water insoluble color salt of the above formula precipitates immediately. This color salt is isolated and purified as described in Example 1.

The new color salt is a yellow powder which dissolves in concentrated sulfuric acid with a greenish yellow and in alcohols with a yellow color.

If, instead of the 17.1 g. of dehydrobietylamine, 17.1 g. of the aminoalkyl-polyhydrophenanthrene mixture used in Example 1 are used, then with otherwise the procedure described, the corresponding aminoalkyl-polyhydrophenanthrene salt of the above 2:1 cobalt complex is obtained which has properties similar to those of the dehydroabietylamine salt of the above formula.

If, instead of the 33.0 g. of the azo dyestuff mentioned, equimolar amounts of one of the azo dyestuffs given in the following Table 3 are used and otherwise the procedure given in this example is followed, then the dehydroabietylamine salts of the corresponding 2:1 chromium complexes are obtained the colors of solutions thereof in ethanol are given in Column III of the same table.

A printing ink which has good stability to storing is obtained and which can be used as such or diluted with ethanol for flexographic printing on paper and aluminum

TABLE 3

| I, No. | II, azo dyestuff | III, colour of ethanol solution |
|---|---|---|
| 29 | 2-amino-5-nitrophenol→1-hydroxynaphthalene-3,6-bis-sulphonic acid methylamide | Blue. |
| 30 | 2-amino-4-methyl, sulphonyl-phenol→1-acetylamino-7-hydroxynaphthalene | Blue-grey. |
| 31 | 2-amino-5-methyl, sulphonyl-phenol→1-phenyl-3-methyl-5-hydroxypyrazole | Red-orange. |
| 32 | 2-aminophenol-4-sulphonic acid methylamide→1-(2'-chlorophenyl)-3-methyl-5-hydroxypyrazole | Orange. |
| 33 | 2-amino-4-nitro phenol→1-phenyl-3-methyl-5-hydroxypyrazole-3'-sulphonic acid amide | Do. |
| 34 | 2-aminobenzoic acid→acetoacetyl-phenyl amide | Greenish yellow. |
| 35 | Mixture of: 2-amino-4-methyl-6-nitrophenol and 2-amino-4-tert. amyl-6-nitrophenol in molar ratio of 1:1→1-phenyl-3-methyl-5-hydroxypyrazole-4'-sulphonic acid amide. | Blue-red. |
| 36 | 2-amino-4-nitro phenol→mixture of: 1-phenyl-3-methyl-5-hydroxypyrazole and 2-hydroxynaphthalene in molar ratio of 1:1. | Brown. |

EXAMPLE 37

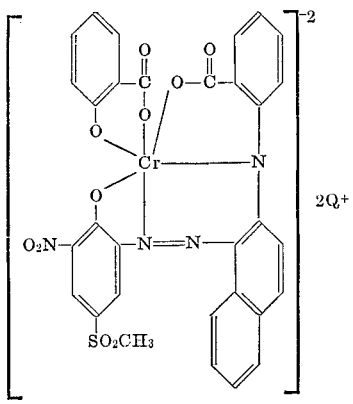

73 g. of the chromium compound obtained by reacting chromosalicylic acid ammonium salt with the azo dyestuff 2 - amino-4-methylsulfonyl-5-nitrophenol→2-(2'-carboxyphenylamino)-naphthalene according to Example 1 of Swiss Pat. No. 336,139, are dissolved in 1000 ml. of 70° hot water. 1000 ml. of an aqueous solution of 15 ml. of 85% formic acid and 60 g. of the aminolkyl-polyhydrophenanthrene mixture used in Example 1 are added dropwise to this solution within 1 hour. The water-insoluble aminoalkyl-polyhydrophenanthrene salt of the above formula precipitates.

This color salt is a green powder which dissolves in concentrated sulfuric acid with a black-violet and in ethanol with a green color.

If, instead of the 75 g. of the above chromium compound, equimolar amounts of a chromium compound obtained by reacting chromo-salicylic acid ammonium salt with one of the azo dyestuffs given in the following Table 4 according to the above patent, and otherwise the procedure given in this example is followed, then the aminoalkyl-polyhydrophenanthrene salts of the corresponding chromium compounds are obtained, all of which dissolve in ethanol with a green color.

TABLE 4

| No. | Azo dyestuff |
|---|---|
| 38 | 2-amino-4-nitrophenol→2-(2'-carboxyphenylamino)-naphthalene. |
| 39 | 2-amino-5-nitrophenol→2-(2'-carboxyphenylamino)-naphthalene. |
| 40 | 2-amino-4-ethylsulfonyl phenol→2-(2'-carboxyphenylamino)-naphthalene. |

EXAMPLE 41

20 g. of color salt according to Example 1,
30 g. of bleached, wax-free shellac,
5 g. of dibutyl phthalate, and
45 g. of ethanol
are mixed.

sheets. Full, yellow, light fast prints having good adhesive powers are obtained with this printing ink on the materials mentioned.

EXAMPLE 42

10 g. of the color salt according to Example 1 are stirred into 90 g. of a solution consisting of 25% of the spirit-soluble polyamide resin which is a polycondensation product of polyamine with dehydrated castor oil, produced according to Example VII of U.S. Pat. 2,663,649,
2% of water,
5% of benzine (fraction 80–100°),
48% of ethanol, and
20% of isopropanol.

A printing ink is obtained which, in flexographic printing, colors cellulose glass a reddish yellow shade. The print has good adhesion and fastness to light.

I claim:
1. In a printing ink consisting essentially of:
   (a) a solvent selected from the class consisting of lower alkanols and lower alkanol-lower alkyl ethers;
   (b) an alcohol-soluble resin vehicle constituting about 10% to 50% by weight of the ink, selected from rosin, a cellulose ether, cellusose ester, maleic resin, phenol-formaldehyde resin, either of the aforesaid resins modified with colophony, a polyamide resin, formaldehyde urea condensate, formaldehyde melamine condensate, ketone formaldehyde condensate, and polyvinyl acetate,
   (c) a wetting agent in sufficient amount to wet a surface to be printed with said ink, and
   (d) a color salt, the improvement wherein the color salt used is of the formula

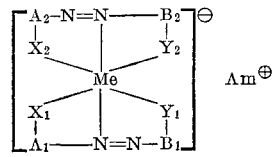

into which formula:
A$_1$ and A$_2$ each represent together with the

—N=N— bridge to which they are linked a radical of a diazonium benzene moiety of an azo dyestuff, each component bearing X$_1$ and X$_2$, respectively, in ortho-position to its respective —N=N— bridge, B$_1$ and B$_2$ each represent the radical of a benzene naphthalene, pyrazole or acetoacetylarylamide coupling component, bearing Y$_1$ and Y$_2$, respectively, in ortho-position to the —N=N— bridge, X$_1$ and X$_2$ each represent —O—, —COO— or —N—SO$_2$—R$_1$, wherein R$_1$ is an unsubstituted alkyl of 1 to 5 carbon atoms or phenyl radical, $Y_1$ and $Y_2$ each represent preferably —O— or they represent —N—$R_2$, wherein $R_2$ is hydrogen or an unsubstituted alkyl of from 1 to 5 carbon atoms or phenyl radical, Me represents chromium or cobalt, and $Am^+$ represents a cation moiety selected from the class consisting of dehydroabietylammonium, dihydrobietylammonium, tetrahydroabietylammonium and dextropimarylammonium, said color salt being used in an amount of from about 0.1% to about 50%, calculated on the weight of the ink, the balance of the composition being the aforementioned components (a), (b) and (c).

References Cited

UNITED STATES PATENTS 2,123,246   7/1938   Koeberle et al. ___ 252—301.2X

JULIUS FROME, Primary Examiner

J. B. EVANS, Assistant Examiner

U.S. Cl. X.R.

106—29, 30; 260—37, 38, 39, 40, 41